United States Patent Office 2,928,846
Patented Mar. 15, 1960

2,928,846

IMIDES OF BICYCLOHEPTENE ADDUCTS

Abraham Bavley, Brooklyn, and Bryce E. Tate, Kew Gardens, N.Y., assignors to Chas. Pfizer & Co., Inc., New York, N.Y., a corporation of Delaware No Drawing. Application January 15, 1957
Serial No. 634,152

4 Claims. (Cl. 260—326.5)

This invention relates to a new and novel class of imides of certain bicycloheptene adducts. More particularly, the present invention relates to the imides of the adducts of cyclopentadiene and itaconic acid, these imides being particularly valuable as fungicides and plasticizers.

The compounds of the present invention may be structurally illustrated as follows:

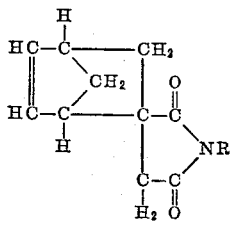

wherein "R" is selected from the group consisting of hydrogen, alkyl containing up to and including eighteen carbon atoms, cyclohexyl, and alkaryl and aralkyl containing a total of up to and including ten carbon atoms. Although all of these compounds may be used as plasticizers, particularly preferred are those wherein "R" is a $C_4$ to $C_{18}$ alkyl group or cyclohexyl.

For the purpose of using the compounds of the present invention as plasticizers of vinyl chloride polymers or copolymers containing vinyl chloride or vinylidene chloride as one of the comonomers, they may be admixed with the selected plastic in proportions of 5 to 50% by weight by conventional means, such as a Banbury mixer, at a temperature of, for example, about 140° C. A subsequently formed sheet of plastic is not only soft and pliable, but is also exceedingly tough, the loss of plasticizer under normal conditions of use and exposure to heat and/or light being minimal.

The valuable compounds of the present invention are active against a number of fungi including, for example, *Alternaria solani*, the fungus responsible for early tomato blight. For the purpose of combatting this fungus, the compounds of the present invention may be suspended in an aqueous medium by the use of conventional emulsifying agents or dissolved in a solvent and sprayed on infected plants. A 5% aqueous acetone solution containing 400 p.p.m. of a compound of the present invention is effective as a spray.

The valuable compounds of the present invention wherein "R" is other than hydrogen are prepared by reacting the adduct of cyclopentadiene and itaconic acid with a primary amine containing the desired "R" substituent in an inert organic solvent, such as xylene under reflux conditions for a time of from about two to about ten hours. The proportion of reactants preferred includes equimolecular proportions or a slight excess of the selected amine. Other high boiling aromatic solvents, such as toluene and chlorobenzene may be employed, the preferred solvents being those which form an azeotropic mixture with water. In the case of the compound wherein "R" is H, an aqueous ammonia solution is employed. The adduct acid starting material for preparing the imides of the present invention may be prepared in accordance with the method described and claimed in concurrently filed copending application, Serial No. 634,153, now Patent No. 2,899,462.

Upon completion of the reaction forming the imides of the present invention the compound may be recovered by distilling over the solvent and any excess amine that may be present. If the resultant compound is solid, it may be purified by recrystallization from a suitable solvent, such as aqueous ethanol.

The foregoing description of the present invention and the examples appearing hereinafter are for the purpose of illustration only and not limiting to the scope thereof which is set forth in the claims.

EXAMPLE I

*N-n-butyl imide of 2-carboxybicyclo-[2.2.1]-hept-5-ene-2-acetic acid*

A solution containing 196 g. of 2-carboxybicyclo [2.2.1]-hept-5-ene-2-acetic acid and 88 g. of n-butylamine in one liter of xylene was heated under reflux for four hours. The reflux condenser was attached to a water trap to separate the water formed during the reaction. At the end of the reflux period the low boiling material was removed by distillation in vacuo and the residue vacuum distilled. After removal of the first fraction boiling at 118 to 140° C. (2.0 mm.), the desired product was obtained at 140 to 150° C. (2.0 mm.).

*Analysis.*—Calcd. for $C_{14}H_{19}NO_2$: Carbon 72.2; hydrogen 8.23; nitrogen 6.00. Found: Carbon 72.0; hydrogen 8.23; nitrogen 6.27.

EXAMPLE II

*Imide of 2-carboxybicyclo-[2.2.1]-hept-5-ene-2-acetic acid*

Fifty grams of the ammonium salt prepared by adding two equivalents of ammonium hydroxide to one equivalent of 2-carboxybicyclo- [2.2.1]-hept-5-ene-2-acetic acid and evaporating the low boiling material was fused and heated in an oil bath at 180 to 190° C. for one hour. The mixture was cooled and the fused mass solidified. The solid material was recrystallized from aqueous ethanol and 42 g. of product was obtained. A second recrystallization gave pure product melting at 156 to 157° C.

*Analysis.*—Calcd. for $C_{10}H_{11}O_2N$: Carbon 67.9; hydrogen 6.44. Found: Carbon 69.1; hydrogen 6.41.

EXAMPLE III

*N-n-heptyl imide of 2-carboxybicyclo-[2.2.1]-hept-5-ene-2-acetic acid*

A mixture of 35 g. of the adduct of cyclopentadiene and itaconic acid with an equimolar portion of n-heptylamine was refluxed in 600 ml. of xylene for six hours. A water trap was attached to the reflux condenser to remove water which was formed during the course of the reaction. At the end of the reflux period the low boiling material was removed by distillation in vacuo and the product recovered by molecular distillation.

EXAMPLE IV

*N-n-decyl imide of 2-carboxybicyclo-[2.2.1]-hept-5-ene-2-acetic acid*

A mixture of 24.6 g. of the adduct of cyclopentadiene and itaconic acid with 45 g. of n-decylamine in one liter of xylene was refluxed for three hours. A water trap was attached to the reflux condenser to remove water which was formed during the course of the reaction. At the end of the reflux period, the low boiling material was removed in vacuo and the product recovered by molecular distillation; $n_D^{26}$ 1.4920.

Analysis.—Calcd. for $C_{20}H_{31}O_2N$: Carbon 75.7; hydrogen 9.84. Found: Carbon 74.8; hydrogen 10.23.

EXAMPLE V

*N-n-octadecyl imide of 2-carboxybicyclo-[2.2.1]-hept-5-ene-2-acetic acid*

A mixture of 25 g. of the adduct of cyclopentadiene itaconic acid with a slight excess of n-octadecylamine was refluxed in 500 ml. of toluene for three hours. At the end of the reflux period, the low boiling material was removed by distillation in vacuo and the product recovered by molecular distillation.

EXAMPLE VI

*N-cyclohexyl imide of 2-carboxybicyclo [2.2.1] hept-5-ene-2-acetic acid*

A mixture of 15 g. of the adduct of cyclopentadiene and itaconic acid with an equimolar portion of cyclohexylamine was refluxed in 500 ml. of chlorobenzene for three hours. At the end of the reflux period, the low boiling material was removed by distillation in vacuo and the product recovered by molecular distillation.

EXAMPLE VII

*N-benzyl imide of 2-carboxybicyclo [2.2.1] hept-5-ene-2-acetic acid*

A mixture of 15 g. of the adduct of cyclopentadiene and itaconic acid with an equimolar portion of benzylamine was refluxed in 500 ml. of xylene for three hours. A water trap was attached to the reflux condenser to remove water which was formed during the course of the reaction. At the end of the reflux period, the low boiling material was removed by distillation in vacuo and the product recovered by molecular distillation.

EXAMPLE VIII

*Para-tolyl imide of 5-carboxybicyclo [2.2.1] hept-5-ene-2-acetic acid*

A mixture of 20 g. of the adduct of cyclopentadiene and itaconic acid with an equimolar portion of p-tolyamine was refluxed in 500 ml. of xylene for three hours. A water trap was attached to the reflux condenser to remove water which was formed during the course of the reaction. At the end of the reflux period, the low boiling material was removed by distillation in vacuo and the product recovered by molecular distillation.

EXAMPLE IX

*Phenethyl imide of 2-carboxybicyclo [2.2.1] hept-5-ene-2-acetic acid*

A mixture of 18 g. of the adduct of cyclopentadiene and itaconic acid with an equimolar portion of phenethylamine was refluxed in 500 ml. of xylene for three hours. A water trap was attached to the refluxed condenser to remove water which was formed during the course of the reaction. At the end of the reflux period, the low boiling material was removed by distillation in vacuo and the product recovered by molecular distillation.

EXAMPLE X

*Ortho-methyl-para-isopropylphenyl imide of 2-carboxylbicyclo [2.2.1] hept-5-ene-2-acetic acid*

A mixture of 15 g. of the adduct of cyclopentadiene and itaconic acid with an equimolar portion of o-methyl-p-isopropylphenylamine was refluxed in 500 ml. of xylene for three hours. A water trap was attached to the reflux condenser to remove water which was formed during the course of the reaction. At the end of the reflux period, the low boiling material was removed by distillation in vacuo and the product recovered by molecular distillation.

What is claimed is:

1. The compound of the formula:

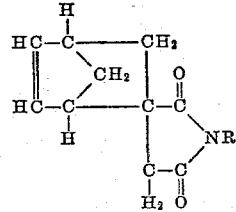

wherein "R" is selected from the group consisting of hydrogen, alkyl containing up to and including eighteen carbon atoms, cyclohexyl, and alkaryl and aralkyl containing a total of up to and including ten carbon atoms.

2. The compound of the formula:

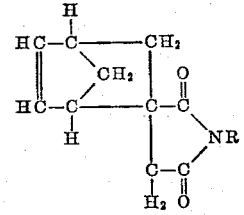

wherein "R" is cyclohexyl.

3. The compound of the formula:

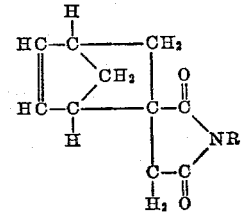

wherein "R" is alkyl containing from four to eighteen carbon atoms inclusive.

4. N-n-butyl imide of 2-carboxybicyclo-[2.2.1]-hept-5-ene-2-acetic acid.

References Cited in the file of this patent

UNITED STATES PATENTS

| | | |
|---|---|---|
| 2,752,361 | Robitschek et al. | June 26, 1956 |
| 2,795,589 | Bluestone | June 11, 1957 |

OTHER REFERENCES

Diels et al.: Liebigs Ann., vol. 460, pp. 103–4 (1928).
Norton: Chem. Reviews, p. 390 (1942), vol. 31.